Sept. 11, 1962  D. LABINO  3,053,715
HIGH TEMPERATURE PIPE INSULATION AND METHOD OF MAKING SAME
Filed March 17, 1958  3 Sheets-Sheet 1

INVENTOR.
Dominick Labino
BY
Nobbe & Swope
ATTORNEYS

Sept. 11, 1962 D. LABINO 3,053,715
HIGH TEMPERATURE PIPE INSULATION AND METHOD OF MAKING SAME
Filed March 17, 1958 3 Sheets-Sheet 3

INVENTOR.
Dominick Labino
BY Nobbe & Swope
ATTORNEYS

United States Patent Office 3,053,715
Patented Sept. 11, 1962

3,053,715
HIGH TEMPERATURE PIPE INSULATION AND
METHOD OF MAKING SAME
Dominick Labino, Grand Rapids, Ohio, assignor, by mesne assignments, to Johns-Manville Fiber Glass Inc., Cleveland, Ohio, a corporation of Delaware
Filed Mar. 17, 1958, Ser. No. 721,878
13 Claims. (Cl. 154—44)

This invention relates generally to insulating units, and more particularly to an improved insulating unit formed of a combination of bonded and unbonded layers of siliceous fibers and a method of producing the same.

This application is a continuation-in-part of my copending application Ser. No. 353,347, filed May 6, 1953, now abandoned, which application was in fact a continuation-in-part of my application Ser. No. 302,627, filed August 4, 1952, now abandoned, both aforementioned applications being assigned to the same assignee as the present invention.

Effective heat insulating structures employing materials of low density and having a capacity for resisting high temperatures have grown in importance though more varied applications of insulation such as in jet airplanes where temperatures of 2000° F. are frequently encountered. In addition specialized clothing, such as fire entry suits also have similar requirements as to their insulation features i.e., light weight and resistance to high temperatures.

Siliceous fibers in general, and particularly glass fibers, have long been noted for their insulating value. However, depending upon the end use of the insulation there are generally two disadvantages to be found in glass fiber insulation now in general use. It is characteristic of insulating mats that the respective fibers in the mat are bonded to one another by a suitable resin, such as a phenolic resin, and the use of such a binder, or of other resin binders, places a limit on the temperature the insulation can withstand. For example, a pipe carrying fluid of a temperature of about 500° F. to 600° F. and having a resin bonded glass fiber mat in contact therewith would normally burn the binder on the hot face of the insulation i.e., the surface of the mat in contact with the pipe and may, in fact, cause sustained punking of the fibers depending upon the quantity of resin employed for binding and the critical heating temperature of the resin used.

In the case of pipes carrying steam, it is not uncommon for the steam to leak at the pipe joints and contact the surrounding insulation. If ordinary glass fibers are used to insulate steam pipes the steam attacks the fibers and leaches the alkali therefrom which in turn tends to attack and corrode the pipe. In accordance with the present invention the above mentioned difficulties are overcome by providing a glass fiber insulation wherein the fibers adjacent the surface to be insulated are of such a size that they are self-adhering and therefore do not require a binder. In a modified form of the invention, fibers are used that have a composition which does not contain ingredients which may be attacked by water or steam. In still a further modification a special high thermal resistant binder is used wherein the minimum critical temperature of the binder is above the maximum temperature of the conduit surface about which the binder impregnated fiber mat is placed.

In addition the improved insulation characteristics are further broadly attained, by providing glass fibers with an impregnant which is capable of inhibiting the passage of infrared rays, is stable at high temperatures and which is adherent to the glass fibers. This impregnation of the fibers is achieved by treating the fibers with a solution of a metal salt, whereafter the composite body is formed into a heat stable product by subjecting the treated materials to high temperatures, and preferably at temperatures equivalent to that at which the material will function in use.

It is therefore an important object of the present invention to provide an improved fibrous insulation material and a method of manufacturing such materials.

Another object of the invention is to provide an insulating unit for conduits comprising a plurality of fibrous layers where the innermost layers are composed of self-adhering fibers and the outermost layers are composed of bonded fibers.

Another object of the invention is to provide an insulating unit for conduits comprising a plurality of fibrous layers where only the outermost layer is composed of bonded fibers.

Another object of the invention is to provide an insulating unit for conduits comprising a plurality of layers of glass fibers where the innermost layer of fibers is composed of fibers consisting essentially of silica and the outermost layer of fibers has a high temperature resistant binder therein to bond the fibers therein to one another whereby the outermost bonded layer acts as a retaining support for the innermost layer of unbonded fibers.

A further object of the invention is to provide a novel radiation shield capable of materially reducing the heat flow through insulation structures.

A further object of this invention is to provide a radiation shield of such effectiveness with respect to density that it may be utilized for clothing purposes.

A still further object of this invention is to provide a radiation shield of glass fibers having an adherent film of an inorganic oxide which shield has a high capacity for resisting the passage of infrared rays.

It is within the contemplation of this invention to provide an improved heat insulation structure having the above noted desirable characteristics of high insulating value at low density.

Other objects and advantages of the invention will become more apparent during the course of the following description when taken in connection with the accompanying drawings.

In the drawings, wherein like numerals are employed to designate like parts throughout the same:

Briefly stated, the improved product of the present invention comprises a composite or multiple layer glass fiber insulation unit preferably composed of at least a first layer of very small diameter, self-adhering, i.e. unbonded glass fibers felted into contact with one another and secured to or surrounded by an adjacent or supporting layer of bonded glass fibers. The unbonded glass fibers, composing the layer of self-adhering fibers, are preferably leached glass fibers consisting essentially of silica with substantially 72% to 80% of their original fiber structure remaining after leaching and which are formed from fibers having a composition in the order of 72% to 80% silica with the remainder sodium oxide.

Figure 1:
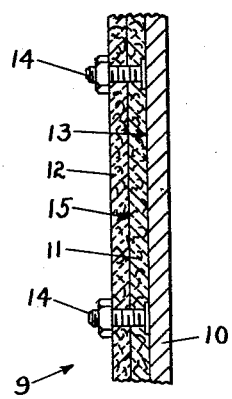
FIG. 1 is a cross sectional view of the improved product of the invention used to insulate a flat surface.

With reference now to the drawings, there is shown in FIG. 1 a flat insulating unit 9 manufactured in accordance with the present invention that is positioned adjacent a hot surface to be insulated, for example, the wall 10 of a boiler. The insulating unit comprises innermost and outermost layers 11 and 12 respectively of glass fibers which are secured against the surface 13 of wall 10 by means of studs 14 welded to the surface 13. The innermost layer 11 of the unit is composed of small diameter self-adhering fibers in the submicron diameter range having an average diameter of between .01 and 1 micron preferably about .75 micron while the outermost layer is composed of fibers in the range of about 1 to 10 microns preferably about 4 microns. The fibers in layer 12 are bonded to one another by a suitable resin, such as a phenolic resin, and also may be bonded to the layer of fibers 11 by means of a coating of resin on the outermost surface 15 of the fibrous layer 11.

Figure 2:
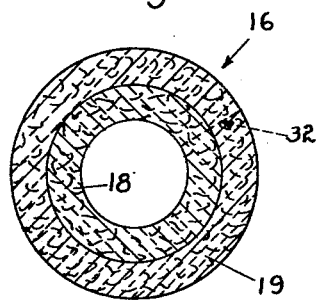
FIG. 2 shows the improved product of the present invention used as an insulating unit or pipe covering for a conduit.
Figure 3:
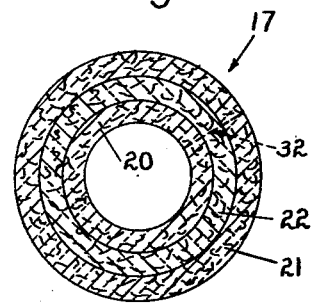
FIG. 3 shows a modified form of the conduit covering disclosed in FIG. 2.

The modified insulating units 16, 17 are shown in FIGS. 2 and 3 and are used as pipe coverings. The unit 16 shown in FIG. 2 is composed of an innermost layer 18 of unbonded self-adhering fibers of the same type used to form layer 11 of the unit 9 shown in FIG. 1 and an outermost layer 19 of fibers of the type used to form the layer 12 of the insulating unit 9. The conduit insulating unit 17 shown in FIG. 3 includes innermost and outermost layers 20 and 21 identical to the layers 18 and 19 of FIG. 2 and a further intermediate layer 22 of unbonded fibers which is also composed of very small diameter fibers secured together by self-adherence.

Figure 4:
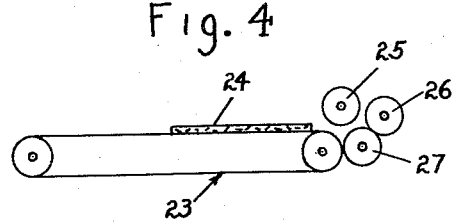
FIGS. 4 and 5 are schematic views of the insulation unit forming apparatus suitable for use in producing the insulating units as illustrated in FIGS. 2 and 3.
Figure 5:
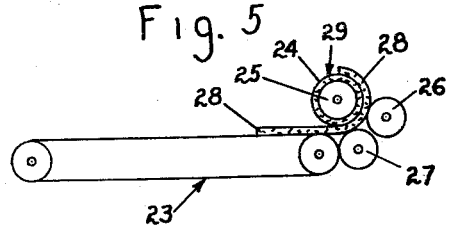
Figure 6:
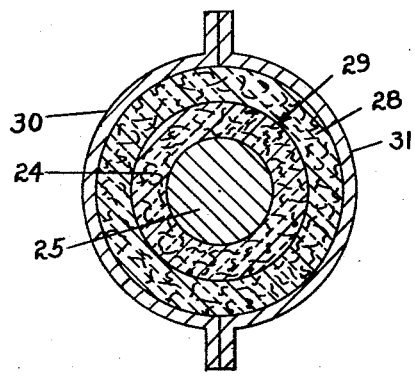
FIG. 6 is a sectional view of the insulating unit as illustrated in FIGS. 2 and 3, and apparatus for curing the binder in the outermost layers of these units.

All the aforementioned fibrous layers may be formed by the apparatus and method shown in U.S. Patent 2,692,220, issued October 19, 1954, in the name of Dominick Labino. This Labino Patent 2,692,220 discloses an apparatus and a method for producing glass fibers having an average diameter of 1 micron or less which may be collected onto a continuous belt and formed into a thin layer. As shown in FIG. 1 of that Labino patent, the thin layer of fibers is wet with a liquid having an acid pH and while being formed on the collecting belt, the fibers if desired may be sprayed with a resin binder. However, when preforming the innermost layers 11, 18 and 20 of fibers, used in the insulating units 9, 16, 17 herein shown in FIGS. 1, 2 and 3, the individual layers of fibers produced by the Labino method should not be sprayed with a binder but instead as shown in FIGS. 4 and 6 of the Labino patent, each layer of fibers would be merely wound upon a drum to form a fiber mat of appreciable thickness. A binder is not necessary to cause the fibers to intimately blend because by reason of their very small diameter they are self-adherent. After being wound upon the drum the layers of fibers which now form a fiber mat could be later slit and as shown in FIG. 5 of the Labino patent pressed into a flat form. After being pressed, the flat layers of self-adhering fibers so formed are used to form a flat insulation unit such as unit 9 illustrated in FIG. 1 or are themselves again wound, as will be later described, about a conventional mandrel to form a single layer insulation casing or the multiple layer insulation units 16 and 17 illustrated in FIGS. 2 and 3.

If it is desired to make a pipe insulating unit to be employed at relatively low temperature but at temperatures higher than the combustion temperature of most resin binders, the layers of fibers formed, slit and pressed to form a mat having no resin therein, would not be leached and would be deposited upon an endless belt 23 forming a portion of the apparatus shown in FIG. 4. The endless belt 23 is utilized to advance a mat 24 of self-adhering fibers, after slitting and pressing, toward a mandrel 25 having positioned adjacent thereto a pair of rolls 26, 27 adapted to press the mat into contact with the mandrel 25 to wrap the mat about the mandrel 25 and to form the innermost fiber layer of the insulating conduits of FIGS. 2 and 3 or a single layer casing if desired. It is understood that the fibrous layer that is to constitute the outermost layer or intermediate layer of a muliple layer casing may likewise be formed in accordance with the apparatus disclosed in FIG. 4 of the Labino patent is hereinbefore discussed.

When this outermost layer i.e. 21 of FIG. 3 or intermediate layer 22 of FIG. 3 is formed, it may be impregnated with a binder as is described in the Labino patent, or it may be formed without being impregnated with a binder. If the aforementioned layers are formed without having present therein any binder, it is often desirable to place a fine spray onto or between the adjacent peripheral surfaces of the respective layers in order to cause the adjacent layers to bond more firmly to one another, it being understood, however, that in certain cases and under certain conditions the friction wrapping of the respective layers one upon another would be sufficient to tightly secure the individual layers one to the other, particularly in the case of a multiple layer casing wherein at least the outer layer had a binder. When forming the flat insulating unit of FIG. 1, suitable structural strength is secured by means of studs 14 and it is therefore evident that the layers are tightly pressed one against another and a binder need not be used unless it is desirable for other purposes.

As hereinbefore discussed, a mat layer of fibers 24 is wound about a mandrel 25 and as seen in FIG. 5, a second mat layer 28 after slitting and pressing is placed upon belt 23 and moved towards a mandrel 25 upon which the mat layer 24 has been previously wound. Mandrel 25 is rotated and cooperating rollers 26, 27 will direct the mat 28 about the prior wrapped mat 24. When forming a multiple layer unit, as distinguished from a single layer unit which would constitute only a single wrapping of a mat layer about a mandrel, e.g. the mat 24 FIG. 5, the second or subsequent layers may have a binder impregnated therein, or if desired only outermost layer, i.e. layer 28 FIG. 5, may be secured about the wound mat 24 by directing onto the exposed peripheral surface 29 of the wound mat 24 a fine spray of suitable binder. The binder used should be able to withstand the temperature of the heat that would be present in the outermost portion of the wrapped mat 24, it being understood that this temperature would be slightly below the hot face temperature of the insulation. However, the minimum critical temperature of the binder must be above the maximum temperature of the surface or portion of the casing in which the binder is present.

After the outermost mat 28 has been wound onto the the innermost layer 24, suitable mold sections 30, 31 are clamped about the mandrel 25, and the mandrel is placed in a suitable furnace or oven to cure the binder in the outermost layer 28 and also the binder applied to peripheral surface 29 of innermost mat layer 24 that is between the two mat layers to bond the two mat layers to one another. After the binder is cured the mold sections are removed from about the mandrel 25, the insulating unit is then slit at 32 parallel to its longitudinal axis and removed from the mandrel. When it is desired to place the unit around a conduit the casing is split apart at slit 32 of FIGS. 2 and 3 to enable the insulating unit to be slipped about a conduit and the edges adjacent the slit may be secured to one another by merely stapling the facing edges together.

When three or more layers, i.e. 20, 21 and 22, are combined to form a single insulating unit or pipe covering it is often desirable, although in certain cases not absolutely necessary, to bond the fibers in the peripheral surface of one layer to the fibers in the peripheral surface of another layer as hereinbefore discussed. Therefore in using a binder, care would be taken that its combustion temperature would not be below the temperature to which it would be naturally subjected when the pipe covering is actually in operable relationship to a heated member. This binder film rather than being placed between one of the layers could be positioned only between the two outermost layers, i.e. 21, 22 and the innermost layer 20 positioned, with respect to intermediate layer 22, by the natural tension and friction wrap of the two layers of self-adhering fibers, i.e. 20 and 22. In addition, a heat reflecting film such as the oxide of a polyvalent metal could be placed between at least layers 20 and 22 and if desired either with or without the resin or binder between layers 21 and 22.

It is therefore seen that a multiple layer pipe covering or insulating unit may be developed in which the layers are progressively more resistant to both the transmission of heat therethrough and to the fusion of the fibers to one another upon moving from the outermost layer to the innermost layer when the densities and thickness of the respective layers are substantially the same. It is understood, however, that if decided increased resistance to heat transmission, i.e. a smaller $k$-factor, might be secured by increasing the density of one of the layers. For example, the improved results could be achieved by using a single layer casing of quartz fibers of 3 pound density in surrounding relationship to a live steam heat source rather than a multilayer unit, if desired. In this case, if the temperature of the heat source was in the neighborhood of 600° F., a pipe covering of quartz fibers ⅝" thick would be sufficient to allow comfortable handling that is would allow uncovered hands to be placed on the exterior of the casing about the heat source. It is also understood that such a layer of insulating material composed of quartz fibers is self-adherent and needs no other retaining means to hold it to its basic shape, however, if desired, a layer of glass fibers impregnated with a thermosetting resin could be wrapped around the periphery of the single layer of quartz fibers as long as the layer of quartz fibers had a hot face temperature of about 350° F. or less. Increasing the thickness of the above layer will also improve its resistance to thermal transmission or conductivity and such changes can be made as required by the temperature limits of the heat source to be insulated. Whether employing a multilayer casing or a single layer casing, as hereinbefore discussed, the surface of either casing exposed to the heat source would be substantially the same so that both the aforementioned examples insure maximum insulating benefits by reason of greatly improved resistance to heat transmission of the leached quartz fibers.

If a single layer casing is desired, that is referring to FIG. 5, a casing having only a layer 24 and omitting layer 28, such a casing could be composed of glass fibers preferably in the range of between 3 pounds and 7 pounds per cubic foot in density and preferably secured together by self-adherence, that is secured without a binder, by reason of their submicron diameter size. Under these conditions the improved insulating qualities are achieved by reason of the fact that there is no binder which if employed would introduce an undesirably low upper temperature limit for the unit. However, if desired, a suitable high temperature binder could be used, provided of course, that its minimum critical temperature was above the maximum temperature of the heat source being insulated. In addition this single layer of glass fibers, as hereinbefore described with respect to the multilayer unit of FIGS. 5 and 6, could be surrounded with a layer of bonded glass fibers hereinbefore described in detail and preferably of the same type as hereinbefore described in connection with layer 28. Such a multilayer unit would secure, by reason of its reduced density and improved heat resistance, greatly improved insulating results similar to that hereinbefore discussed with reference to the other multilayer units.

It has been further found that variations may be made in the densities of the individual layers, either in combination with or without variation of the thickness of the respective layers, and that the resultant pipe casing or insulating covering is both efficient in operation and economic to manufacture. For maximum results, keeping in mind both efficiency and lowest cost of manufacture, a density within the ranges of substantially 3 to 7 pounds per cubic foot, and preferably 3 pounds per cubic foot for one or both of the layers, has been found satisfactory. When excessively high temperature heat sources are insulated, additional resistance to heat transmission is secured by the use of either an additional layer or an increase in the thickness of one of the aforementioned layers. If any of the layers is to have a binder therein it has been found that a binder content between substantially 10% and 25% based on the ignition loss is satisfactory and preferably between about 15% to 20%. The fact that the multilayer units are more resistant to heat transmission, i.e. have a lower $k$-factor or lower thermal conductivity on moving towards the center, is mainly due to the fact that the innermost layer, adjacent the heat source, is composed of leached fibers, as will be hereinafter discussed. The adjoining layers moving from the innermost to the outermost, therefore need not have as great a resistance to heat, i.e. they may have a larger $k$-factor, by reason of the fact that the passage of heat will be initially retarded by the innermost layer. Accordingly a correspondingly reduced amount of heat will be passed to the adjacent layer so that the respective layers, moving from the innermost layer adjacent the heat source being insulated towards the outer layer, will be subjected to a reduced intensity of heat.

One possible type of multilayer construction would be a three layer member in which the inner layer is composed of submicron diameter, self-adhering, leached fibers consisting essentially of silica, i.e. quartz, having substantially 72% to 80% of their original structure remaining after leaching, the intermediate layer being unleached, self-adhering, submicron diameter glass fibers and the outer layer being composed of bonded glass fibers in the diameter range of 1 to 10 microns.

The thickness of the mats used to form the respective fibrous layers for the insulating unit should be proportioned so that preferably individual glass fibrous layers comprising at least two or three thicknesses are wound upon themselves first and then slit and pressed to form a mat 24 or 28. This has been found desirable since not only must relatively compact layers be formed but it is also important that no layer be capable of unwinding or become separated from an adjacent layer. The thickness of the respective mats 24, 28 may be controlled by varying the speed of collecting belts and number of wraps about the forming drums upon which the layers are received during their initial formation.

Therefore the insulating unit may be formed of glass fibers having an average diameter of less than about 1 micron and which are bonded together by self-adherence. These self-adherent submicron diameter fibers have been found to possess greatly improved heat insulating qualities particularly for use with the insulation of heat sources above 1000° F. and because they are self-adherent and require no binder to bond the fibers to one another, this insulation is not subject to the danger of punking which is present when the binder is used.

When, as hereinbefore discussed the insulating unit is to be used for relatively high temperature insulating purposes, the mat of very fine diameter fibers used to form the innermost layer is discharged free of all oxides except silica. This may be done by submerging the mat layer formed according to FIG. 4 of the Labino Patent 2,692,220, and also illustrated in FIG. 6 of that patent, in a container of hot acid and retaining the mat in contact with the acid until the alkali is removed and the fibers therein consist essentially of silica. These leached glass fibers, now in mat form, may be placed on the belt 23 FIG. 4, as hereinbefore described, and wrapped about a mandrel 25 and will form either a single layer conduit, or cylindrical casing, or the innermost layer of a high temperature insulating material. The process for leaching the fibrous mat is disclosed in my co-pending application Ser. No. 562,722, filed February 1, 1956, which application is a continuation in part of my application Ser. No. 353,348, filed May 6, 1953, now abandoned, this last mentioned application being a continuation in part of my application Ser. No. 304,150, filed August 13, 1952, now abandoned, all the aforementioned applications being assigned to the same assignee as the present application.

The original glass composition from which the fibers are to be thus leached may vary, but it is preferred to use a fiber composition comprising about 72% to 80% silica and 20% to 28% sodium oxide. With such a composition the sodium oxide is readily leached from the fibers and leaves only the silica. Another advantage of using such a composition is that when glass fibers having a lower initial silica content are leached they are considerably more fragile. For example, a fiber leached from a composition having a lower silica content such as the well known "E" glass, only has around 55% of its original structure remaining after being leached and thus these fibers must be very carefully handled if a mat formed of such fibers is to be wound upon a mandrel. However, when fibers of the preferred glass composition such as one having 72% to 80% original silica are leached, substantially 72% to 80% of their original silica structure remains after leaching and therefore they are considerably stronger so that a mat formed of such fibers may be wound upon itself without impairing the fibers. When the innermost fiber layer is formed of leached fibers, that is where the fibers after leaching consist essentially of silica, an improved product may further be obtained if such a mat, after leaching, is fired to a temperature in the order of about 1000° F. This will remove the water of hydration resulting from the leaching operation and thus will prevent any water from being driven off when the insulating unit is used to insulate a conduit carrying fluids of very high temperature.

Figure 7:
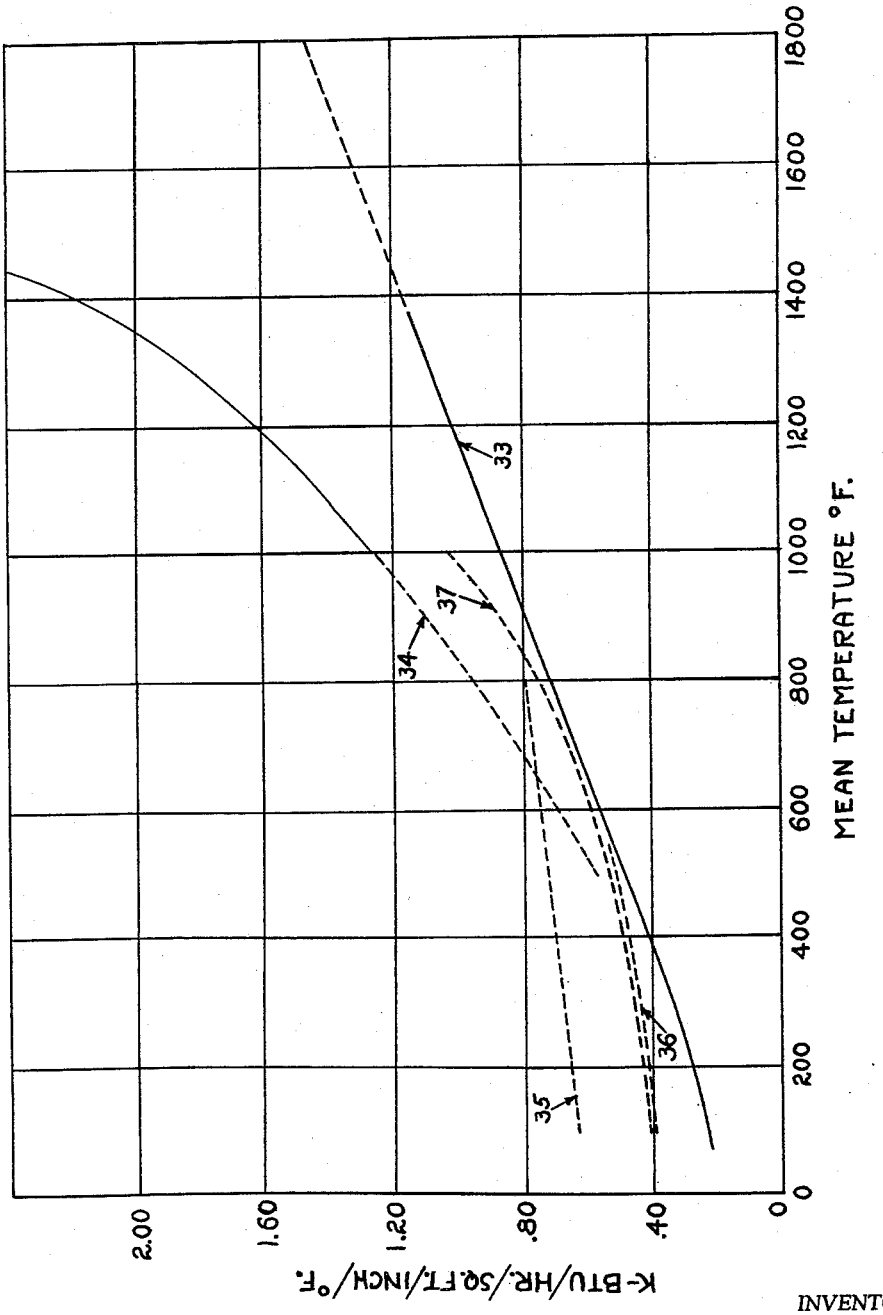
FIG. 7 is a graphic representation comparing well-known and widely used insulation materials with respect to thermal conductivity vs. mean temperature.

Referring now to FIG. 7 there is graphically illustrated the novel and unique result achieved through the use of the multilayer pipe covering formed according to the present invention. The curve 33 as shown in the graph represents the heat transmission or conductivity of a mat of the present invention when the mat is composed of leached silica fibers, hereinbefore disclosed, and has a density of substantially 3 pounds per cubic foot and fiber diameters of less than about 1 micron. Curve 34 shows generally the heat transmission qualities or conductivity of a 3 pound density leached fibrous material consisting essentially of silica wherein the base composition from which the fibers were attenuated was "E" glass. The curve 34 has plotted values between mean temperatures of 500° and 1000° F. and the solid line portion of the curve has been drafted by extrapolation. The curve 35 represents the heat transmission or conductivity of twenty-five pound density diatomaceous silica plotted to the limit of published data and curve 36 represents the same for 11 pound density of 85% magnesia having an upper temperature limit of 550°. Curve 37 represents the heat transmission or conductivity of 11 pound density calcium silicate plotted to an upper temperature limit of substantially 1000° F.

An examination of these curves shows the vastly improved insulation qualities of the pipe covering of the present invention particularly at the high temperature ranges where despite a relatively low bulk density of 3 pounds per cubic foot, greatly improved resistance to thermal conductivity or transmission, i.e. smaller k-factor, has been achieved by an insulation unit of the present invention over all of the known similar insulation materials which had the same or even greater density. All of the compositions that are graphicaly represented have been found to fail for one reason or another at a mean temperature substantially below that of the instant material. The most efficient insulating material charted, the twenty-five pound diatomaceous silica insulator, broke down at about a mean temperature of 900° F. or a hot side temperature of between 1500° to 1900° F. while the insulating material of the instant case functioned in a satisfactory manner to a tested hot face temperature of 2279° F. or a mean temperature of 1400°.

The reduced density of the instant insulation has been found to be important since it has made available increased uses for the fiber insulating material of the present units as compared to the prior insulating units. Hereinbefore it was believed that efficiency of a glass fiber insulation unit in resisting heat passage was a direct function of density and hence expense of the material was greatly due to this requirement for high density. However, in practice it has been found that when self-adhering quartz fibers are used that it is possible to reduce the density to about 3 pounds per cubic foot and this has greatly broadened the beneficial uses that the material may be used for by removing a major deterrent, i.e. high cost of manufacture, and replacing it with a more modest cost.

Figure 8:
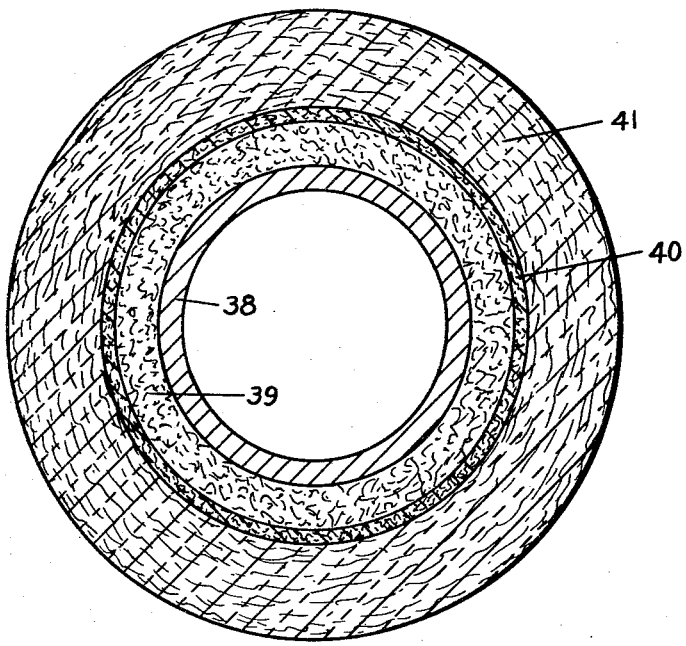
Fig. 8 is a sectional view of a modification of the pipe covering as disclosed in FIG. 1.

Referring to FIG. 8 there is shown a metal tube 38 which is adapted for the passage of high temperature gases. Surrounding the tube 38 is an inner layer 39 of insulation preferably of quartz or substantially pure silica fibers that are particularly capable of withstanding the high temperatures to which the tube is subjected. These quartz fibers are of the type described in my co-pending application Ser. No. 562,722, filed February 1, 1956 which application is a continuation-in-part of my application Ser. No. 353,348, filed May 6, 1953, now abandoned, this last mentioned application being a continuation-in-part of my application Ser. No. 304,150, filed August 13, 1952, now abandoned, and which fibers, as hereinbefore described, compose the inner layer 11, 18 and 20 of FIGS. 1, 2 and 3.

When using the insulating units herein described under certain circumstances, the total weight of the unit itself has been found to be a critical factor. This is particularly true in insulating air craft, and the like, where maximum insulation is desired through an insulation unit of a minimum weight. In order to secure the advantages of the hereinbefore described multilayer high temperature insulating unit and to further minimize weight it has been found desirable to provide a heat interceptor layer between at least two layers of a multilayer unit. Such an interceptor will secure the same insulating qualities for this modified unit that were achieved by the units hereinabove described but will allow substantial reduction of the thickness of the layers that are outside of the interceptor layer with respect to the heat source, and this thickness reduction will result in a desirable lessening of the unit weight.

To achieve this improved result there is disclosed in FIG. 8 a modified insulating conduit 38 that includes a film or layer of an impregnate capable of inhibiting the passage of infrared rays which is stable at high temperatures and which is adherent to the glass fibers.

It is the practice of this embodiment of the invention to employ as an impregnating material a water soluble inorganic salt and to dip, paint, spray or flood the fibers therewith. The concentration of the salt is not critical, but for most purposes a solution which approaches saturation is entirely suitable. The preferred salts for application to the fibers are the nitrates of the heavy metals for they are water soluble and are readily decomposed to their oxides which are stable at high temperatures. Other components having the desired characteristics may be employed; for example, the sulfates of copper and iron are water soluble to a sufficient degree and may be utilized when applied to the glass fibers and heated in accordance with the method of invention. Suitable water soluble nitrates of the heavy metals include those of cobalt, iron, manganese, copper, lead, nickel and chromium. Of these cobalt nitrate is preferred as it is converted to the oxide form with gentle heating, is extremely stable at temperatures above 1660° F. and is highly adherent to the fibers.

The nitrates of the other metals are quite satisfactory however, and provide upon decomposition products entirely suitable for the practice of the invention.

The temperature at which the nitrate impregnated into the glass is fired is not critical but should be sufficient to insure that no deleterious decomposition will take place under service conditions; this status is most easily attained by firing at the temperature to which the material will be subjected in service for a length of time sufficient to insure of complete decomposition of the particular nitrate. The presence of some metal in the product of decomposition such as may occur in the decomposition of silver nitrate is not detrimental.

It is to be noted in connection with the nitrates and the firing thereof that while certain of the nitrates are not available in all valences of the metal, upon heating more than one valence may be present. Thus cuprous nitrate is not so far as is known, attainable but upon firing of the cupric nitrate both the CuO and $Cu_2O$ form may occur, the product being a solid solution of cuprous oxide in cupric oxide. The presenec of two oxides, or indeed a transformation from one side to another in service does not affect the radiation inhibiting capabilities of the material nor the effectiveness of the product as a whole.

The chemical constitution of the glass of the fibers is not a critical factor but those fibers which are alkali free are preferably employed, particularly when chromium is the metal component. The chromic component although its oxides are water insoluble tends to form water soluble salts if the glass is high in alkali and hence the product will not display the water resistance which characterizes it when a low alkali glass is used. Where the glass fiber is high in alkali content and a water insoluble product is required cobalt, iron or lead preferably constitutes the metal portion of the salt.

A thin layer of impregnated and heated glass fibers provides a highly concentrated reflective surface for heat rays and may be effectively employed in conjunction with a layer of insulation which is in contact with a source of radiation; also a thin light weight reflecting layer may be sandwiched between other layers of insulation if desired.

It should be noted that it is not necessary that the impregnant be employed in a separate strata for the impregnant may be conveniently applied to a surface of an insulating fibrous layer on the side thereof remote from the radiating source and will thus function effectively to prevent the passage of radiation.

It has been found that the use of the impregnant in applications normally employing fibrous glass as insulation has reduced the heat flow through the insulation by as much as one-half.

Figure 9:
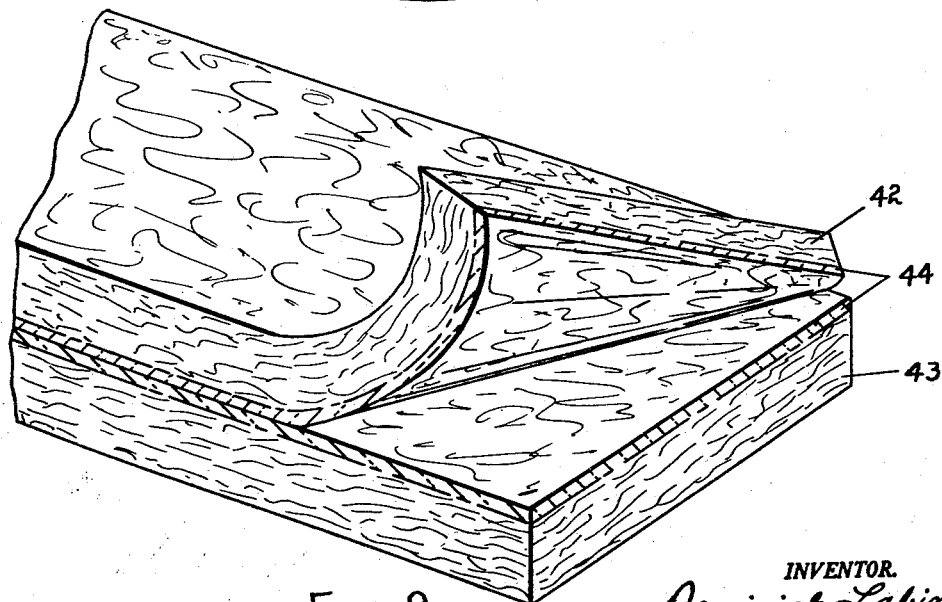
FIG. 9 shows a modification of the pipe covering as disclosed in FIG. 2.

With particular regard to the FIGS. 8 and 9, this inner insulation layer 39 is surrounded by a thin pad 40 of glass fibers impregnated with cobalt oxide. The fibers of this layer are preferably a blown material having a fiber diameter in the range of about 3 microns or less; fibers in the submicron range, such as those known commercially as AAA fibers having a diameter of about 0.75 micron are eminently suited for the purpose since they are readily saturated and retain the oxidized product tenaciously.

The cobalt oxide impregnated pad is formed by merely soaking a thin sheet of the glass fibers in a substantially saturated water solution of cobalt nitrate and thereafter firing the impregnated product at about 1600° F. to drive off the water and reduce the nitrate to the oxide. While the time of firing varies with the concentration of the cobalt nitrate on the fibers a time of about 15 minutes is ample at the temperature stated. The product of this firing is pliable, black in color, the oxide is highly adherent to the glass and water insoluble thereon.

Referring again to FIG. 8 the thin pad 40 is surrounded by a relatively thick outside bat 41 of glass fibers of a commercial quality having a density of about .6 pounds per cubic foot and the fiber diameters of which are designated in the industry as "B" size.

When an insulation structure such as that described above was employed ultilizing as the impregnated pad 40 a mil thickness of glass fibers thoroughly impregnated with cobalt oxide and a one-half inch thickness of insulation in layer 39 the following data were obtained:

|  | Degrees Fahrenheit | | | |
| --- | --- | --- | --- | --- |
| Temperature within tube 38 | 1,300 | 1,500 | 1,600 | 1,650 |
| Temperature at outside of layer 41 | 340 | 400 | 440 | 460 |

In contrast thereto when employing a structure having the same kind of insulation material but without the impregnated pad 40, and having the same total weight as that on which the above data were obtained, the following results were observed:

|  | Degrees Fahrenheit | |
| --- | --- | --- |
| Temperature within tube 38 | 1,325 | 1,520 |
| Temperature at outside of layer 41 | 425 | 520 |

It is to be noted that with the radiation shield inserted a temperature of 1650° F. in tube 38 resulted in only a temperature of 460° F. on the outside of the insulation bat 41, while using the material in a normal way a temperature at the inside, which was 130° less, resulted in a temperature at the outside of 60° more; these results represent a difference in heat flow of about 2:1 and clearly illustrate the superior results attainable with the radiation shield of invention.

FIG. 9 illustrates a body of insulating material having an upper layer 42 and a lower layer 43, the interface 44 between the layers being provided with impregnant extending to a slight depth into each layer. The insulation structure in this instance is attained by simply spraying the face of each of the layers 42 and 43 with a solution of water soluble salt, such as iron nitrate, and then heating the layers separately to form the oxide; thereafter the layers are positioned together as shown and held in position on the structure to be insulated by any suitable means.

This latter described arrangement is similarly effective for materially reducing the heat flow through the insulation structure and results substantially equivalent to those set out with respect to the structure FIG. 1 are attainable. The layers of material, however, it is to be noted, do extend to a slight depth into each body of insulation material and accordingly the radiation reflecting layer is not as concentrated or as sharply defined as the layer of radiation reflecting materials 40 of FIG. 8.

It will be readily understood by one skilled in the art that in most instances it will be desirable to impregnate only one body of a composite unit since thereby a heating step is saved but as indicated both may be impregnated and fired if so desired.

It is to be understood that the forms of the invention disclosed herein are to be taken as the preferred embodiments thereof, and that various changes in the shape, size and arrangement of parts as well as various procedural changes may be resorted to without departing from the spirit of the invention or the scope of the following claims.

I claim:

1. A fibrous insulating hollow casing including a plurality of layers, at least the innermost layer being a mat formed of haphazardly arranged glass fibers having an average diameter of less than about 1 micron and bonded together by self-adherence and at least the outermost layer being formed of felted larger diameter glass fibers, the fibers in the outermost layer being bonded to one another and said innermost layer having a lower $k$ factor than said outermost layer.

2. A hollow insulating unit for conduits, comprising a first innermost fibrous layer in mat form, the fibers in said first layer consisting essentially of silica and bonded together by self-adherence, and a second fibrous layer also in mat form of glass fibers in surrounding relationship to said first layer, the fibers in said second layer being bonded together by an adhesive and secured to the first fibrous layer, and said first layer having a lower $k$ factor than said second layer.

3. A hollow insulating unit as defined in claim 2, wherein the fiber density in both the aforementioned layers is between 3 pounds and 7 pounds per cubic foot.

4. A composite insulating unit comprising a first mat consisting of haphazardly arranged siliceous fibers, said fibers having an average diameter of less than about 1 micron and secured together by self-adherence, and a second mat of haphazardly arranged siliceous fibers bonded to one another.

5. A composite insulating unit as defined in claim 4, having a third mat positioned between said first and second mat, said third mat having at least one surface thereof coated with a continuous film of an oxide of a polyvalent metal.

6. A combined heat reflecting and heat insulating structure as defined in claim 5, wherein the surfaces of the fibers of the heat reflecting layer are coated with a continuous film of cobalt oxide.

7. A method of forming an insulating unit comprising the steps of wet felting unbonded glass fibers of submicron diameter into a self-adhering mat, winding the mat about a mandrel, winding a second mat of fibers containing an uncured thermosetting binder about said first mat of fibers, and then heating the mandrel and mats of fibers to set the binder in said outermost mat of fibers.

8. A method of forming an insulating unit as defined in claim 7, including saturating the fibers of said second mat with an oxide of a polyvalent metal and wrapping a third mat of glass fibers impregnated with a binder about said second mat before the unit is heated to cure the binder.

9. The process of producing a combined heat insulating structure, comprising forming a sandwich-like structure comprising a first heat insulating layer of felted glass fibers, said fibers having an average diameter of less than about 1 micron and being bonded together by self-adherence, forming a heat reflecting layer of glass fibers having a continuous film of an oxide of a polyvalent metal covering the surfaces thereof, positioning said heat reflecting layer upon said first layer, and positioning a second heat insulating layer of felted siliceous fibers adjacent said heat reflecting layer so as to position the said heat reflecting layer between said first and second heat insulating layers.

10. An insulated pipe structure, comprising an innerwall, a surrounding layer of haphazardly arranged silicious fibers having an average diameter of less than about one micron and being bonded together by self-adherence, and a second haphazardly arranged layer of bonded silicious fibers surrounding said first layer, said surrounding layer having a lower $k$ factor than said second layer.

11. An insulated pipe structure, comprising an innerwall, a surrounding self-sustaining mat of silicious fibers having an average diameter of less than about one micron and bonded to one another by self-adherence, and a second surrounding mat of glass fibers of larger diameter bonded to one another, said second mat having a higher $k$ factor than said first mat, said first and second mats having a density of between about 3 pounds to about 7 pounds per cubic foot.

12. A composite insulating unit comprising a first mat consisting of haphazardly arranged fibers of substantially pure silica, said fibers having an average diameter of less than about 1 micron and secured together by self-adherence, and a second mat of haphazardly arranged siliceous fibers of a larger diameter bonded to one another, said first mat having a $k$ factor lower than that of said second mat.

13. A composite unit as described in claim 12 wherein the fiber density of each mat is between about 3 and about 7 pounds per cubic foot.

References Cited in the file of this patent
UNITED STATES PATENTS

| | | |
|---|---|---|
| 2,069,648 | Denner | Feb. 2, 1937 |
| 2,331,146 | Slayter | Oct. 5, 1943 |
| 2,339,431 | Slayter | Jan. 18, 1944 |
| 2,428,653 | Collins | Oct. 7, 1947 |
| 2,439,137 | Keller | Apr. 6, 1948 |
| 2,489,242 | Slayter et al. | Nov. 22, 1949 |
| 2,526,870 | Jelinek et al. | Oct. 24, 1950 |
| 2,552,124 | Tallman | May 8, 1951 |
| 2,565,941 | Barnard | Aug. 28, 1951 |
| 2,635,390 | Parker | Apr. 21, 1953 |
| 2,643,487 | Parker | June 30, 1953 |
| 2,787,542 | Labino | Apr. 2, 1957 |
| 2,790,464 | Stephens et al. | Apr. 30, 1957 |